US005078549A

United States Patent [19]

Schweiss et al.

[11] Patent Number: 5,078,549

[45] Date of Patent: Jan. 7, 1992

[54] HYDROCYCLONE

[75] Inventors: Peter Schweiss, Langenau; Hans-Dieter Dorflinger, Heidenheim; Edgar Muschelknautz, Stuttgart, all of Fed. Rep. of Germany

[73] Assignee: J. M. Voith GmbH, Heidenheim, Fed. Rep. of Germany

[21] Appl. No.: 555,318

[22] Filed: Jul. 19, 1990

[30] Foreign Application Priority Data

Jul. 19, 1989 [DE] Fed. Rep. of Germany ....... 3923849

[51] Int. Cl.[5] ......................... B65G 53/34; B04C 5/81

[52] U.S. Cl. .................................... 406/173; 209/211; 210/512.1

[58] Field of Search ......................... 406/173; 209/211; 210/512.1; 55/459.1

[56] References Cited

U.S. PATENT DOCUMENTS 2,377,524 6/1945 Samson et al. ...................... 209/211
2,573,192 10/1951 Fontein .......................... 209/211 X
2,648,433 8/1953 Wright et al. ....................... 209/211
2,706,045 4/1955 Large ................................. 209/211
2,783,887 3/1957 Chisholm ............................ 209/211
3,404,778 10/1968 Woodruff et al. ........... 210/512.1 X
4,927,298 5/1990 Tuszko et al. ...................... 406/173

FOREIGN PATENT DOCUMENTS 1037980 9/1953 France ............................... 209/211

*Primary Examiner*—Russell D. Stormer
*Assistant Examiner*—James M. Kannofsky
*Attorney, Agent, or Firm*—Baker & Daniels

[57] ABSTRACT

A hydrocyclone has a separating part A with a diameter which toward its outlet end for the heavier fraction decreases gradually from a diameter 2 $R_a$, with the radius being subject to the formula:

$$R = R_a \cdot \sqrt{1 - x/l}.$$

This describes essentially the shape of a parabola, so that the separating part can practically be considered as a paraboloid. Achieved thereby is an optimum separating performance of the hydrocyclone.

13 Claims, 1 Drawing Sheet

HYDROCYCLONE

BACKGROUND OF THE INVENTION

The invention concerns a hydrocyclone with a reversing flow, for separation of foreign particles from suspensions with a specific mass greater than the mass of the fluid of the suspension. The hydrocyclone has a cylindrical entrance part of large diameter, in which area there is located, centrally, an outlet pipe for the lighter accepts fraction; and has a part having a gradually decreasing diameter which has at its narrowest cross section an outlet for the heavy fraction. Various hydrocyclones are known in the prior art.

The problem underlying the invention is to further improve the separating effect of such a cyclone.

SUMMARY OF THE INVENTION

This problem is inventionally solved by the features of the hydrocyclone of the present invention. The inside diameter of the part (A) having a gradually decreasing diameter is subject to the formula:

$$R=R_a\cdot\sqrt{1-x/1}$$

where R represents the inside radius of part A, $R_a$ is the beginning radius of part A adjacent to the cylindrical part, and x is the coordinate beginning at the beginning radius and extending along the central longitudinal axis of the hydrocyclone, where a variation which gradually increases or decreases toward the x-axis, upward or downward is possible, for instance through a sectional, conic design of the wall. 1 is the theoretical overall length of the parabola obtained with the formula to the intersection with the x-axis, where additionally the condition $1=(10 \text{ to } 24)R_a$ exists. The cyclone is truncated at its outlet end for the heavier fraction at a length $l_k$ with a radius $R_d$, in order to form an outlet opening, or nozzle.

It has been found that, with a design of the cyclone part where the diameter decreases gradually toward the exit end for the heavy substances, a good separating effect is achieved when fashioning the outside wall of this part according to the said formula.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
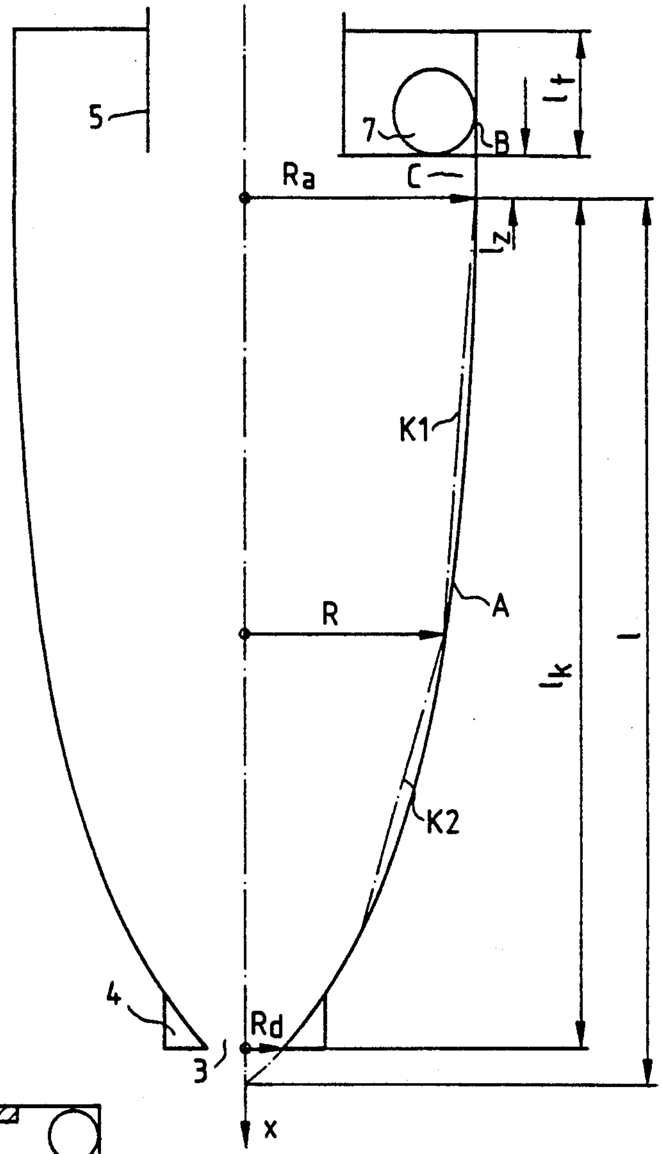
FIG. 1, shows basically a cross section of the cyclone.

The cyclone according to FIG. 1 comprises parts A, B and C. In the entrance area B, it is provided with a tangential inlet 7 and a central withdrawal, or outlet, pipe 5 for the lightweight accepts substances. Contained inbetween is a cylindrical part C with a radius $R_a$. With that same radius also begins the part A featuring the gradually decreasing diameter, with the start of the x-axis being situated here which extends along the central longitudinal axis of the cyclone. The radius R of this partial section is then subject to the formula $R=R_a\cdot\sqrt{1-X/1}$.

The separating part A ends in the nozzle body 4 by means of nozzle 3 serving as an outlet for a heavy fraction. This nozzle 3 is created by truncating the theoretical overall length 1 of the cyclone to a length $l_k$. The required nozzle diameter, thus, is obtained by various nozzle parts 4 that can be attached to the body of the hydrocyclone.

Preferably above the nozzle part 4, i.e., $X<0.95\cdot l_k$, an approach of the contour of the cyclone to the stated formula is possible through conic sections $k_1$, $k_2$, where the variation upward or downward from the exact value of $R_a$ according to the above formula should not exceed the maximum deviation of 5–10%, wherein the closer the nozzle 3 the smaller is the permissible variation. The length $l_z$ of the cylindrical intermediate section C should amount maximally to 0.3 times the overall length $l_k$ of the cyclone. The length of $l_t$ of the cylindrical entrance section is equal to 4 to 7 times the inner radius of withdrawal pipe 5. The inside radius of the withdrawal pipe for the lightweight substances should be equal to $(0.3 \text{ to } 0.4)\cdot R_a$. This condition applies specifically to the initial area of the entrance end of the withdrawal pipe 5. The cylindrical intermediate section C could have an approximately 10% greater (C') or 10% smaller (C'') radius than the beginning radius $R_a$ of the lower part A and to the length of which there is applicable a length $l_z$, where $l_z=(0 \text{ to } 0.3)l$, or $l_z=(0 \text{ to } 0.31)l_k$.

Figure 3:
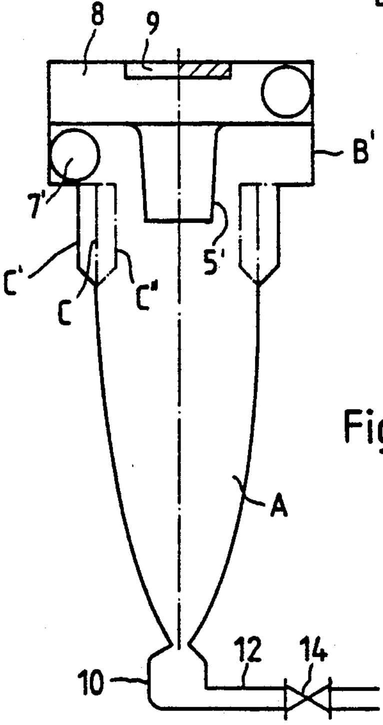
FIG. 3, shows another embodiment of the inlet area of the cyclone.

According to FIG. 3, the lower part of the withdrawal pipe 5' may have a slightly conic like design with a cone angle between 0 degrees and 6 degrees, based on one side. The radius of the entrance part B' according to FIG. 3 is 20 to 30% larger than the beginning radius $R_a$ of the lower part A.

Approximately the same diameter is used for the separating space 8 for the lightweight substances, which is provided with an upper baffle plate 9 arranged opposite the discharge opening of the conic withdrawal pipe 5' for the lightweight substances.

Figure 2:
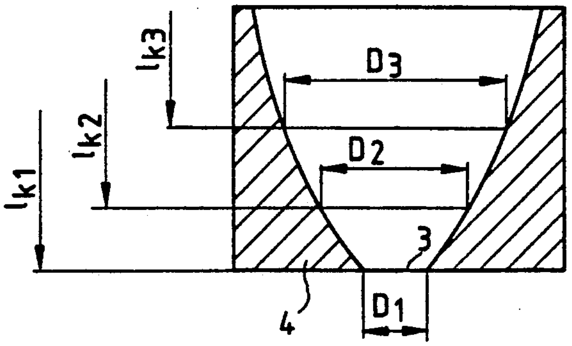
FIG. 2, shows an enlarged section of the discharge end.

FIG. 2 additionally illustrates that by "truncating" the overall length of the cyclone, on the nozzle body 4, the outlet diameter of the nozzle body $D_1$, $D_2$, $D_3$ with the gradually decreasing value at overall lengths of the cyclone part $l_{k1}$, $l_{k2}$, and $l_{k3}$ is obtained.

It is understood, naturally, that the outlet end of the hydrocyclone for the heavy fraction empties in a space that is sealed from the air. To that end, a collection container may be provided and the nozzle diameter adapted to the required withdrawal rate by the mentioned "truncation" of the overall length of the cyclone.

On the other hand, the withdrawal end for the heavy fraction may also empty in a chamber 12 to which a withdrawal line 14 is connected. A throttle valve 13 may be provided in this withdrawal line enabling a control of the withdrawal rate by variation of the pressure.

While this invention has been described as having a preferred design, the present invention can be further modified within the spirit and scope of this disclosure.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrocyclone with a reversing flow for the separation of foreign particles from suspensions of fluid wherein said foreign particles have a specific mass greater than the mass of the fluid of the suspension, said hydrocyclone having a central longitudinal axis, comprising:

a large diameter cylindrical entrance part, said cylindrical entrance part having an area wherein an outlet pipe for an accepts fraction is centrally located;

a part adjacent said cylindrical entrance part and having a gradually decreasing diameter, said part having a cross section and having an outlet for a heavy fraction at its narrowest cross section, said part further having an inside diameter having an inside radius subject to the formula:

$$R=R_a\cdot\sqrt{1-x/l}$$

where R represents the inside radius of said part having a gradually decreasing diameter, $R_a$ represents the beginning radius of said part adjacent to said cylindrical entrance part, and x represents a coordinate beginning at said beginning radius and extending as an x-axis along said central longitudinal axis of said hydrocyclone, where l represents the theoretical overall length of a parabola obtained with said formula to an intersection with said axis, where additionally $l=(10\text{ to }24)R_a$ and said cyclone is truncated at said outlet for said heavy fraction at a length $l_k$ with a radius $R_d$ to form said outlet.

2. A hydrocyclone as described in claim 1, wherein a second cylindrical part is positioned between said cylindrical entrance part and said part having a gradually decreasing diameter, said second cylindrical part having a radius that is maximally 10% greater or 10% smaller than said beginning radius of said part having the gradually decreasing diameter and said second part has a length $l_z$, where $l_z=(0\text{ to }0.3)l$ or $l_z=(0\text{ to }0.31)\,l_k$.

3. A hydrocyclone as described in claim 2, in which said outlet pipe for said accepts fraction has an entrance end having an inside radius equal to $(0.3\text{ to }0.4)R_a$.

4. A hydrocyclone as described in claim 2, wherein said hydrocyclone has a tangential inlet.

5. A hydrocyclone as described in claim 4, wherein said outlet pipe for said accepts fraction has a conic design having an angle of 0 degrees to 6 degrees, based on one side.

6. A hydrocyclone as described in claim 2, wherein a withdrawal line having a throttle valve is provided at said outlet for said heavy fraction for varying the pressure at said outlet end, whereby the rate of withdrawal of said heavy fraction may be controlled.

7. A hydrocyclone as described in claim 6, wherein said heavy fraction empties into a chamber connected to said withdrawal line.

8. A hydrocyclone as described in claim 1, in which said outlet pipe for said accepts fraction has an entrance end having an inside radius equal to $(0.3\text{ to }0.4)R_a$.

9. A hydrocyclone as described in claim 8, wherein said hydrocyclone has a tangential inlet.

10. A hydrocyclone as described in claim 1, wherein said hydrocyclone has a tangential inlet.

11. A hydrocyclone as described in claim 10, wherein said outlet pipe for said accepts fraction has a conic design having an angle of 0 degrees to 6 degrees, based on one side.

12. A hydrocyclone as described in claim 1, wherein a withdrawal line having a throttle valve is provided at said outlet for said heavy fraction for varying the pressure at said outlet end, whereby the rate of withdrawal of said heavy fraction may be controlled.

13. A hydrocyclone as described in claim 12, wherein said heavy fraction empties into a chamber connected to said withdrawal line.

* * * * *